(12) United States Patent
Luxey

(10) Patent No.: US 9,043,154 B2
(45) Date of Patent: May 26, 2015

(54) COMPUTER-BASED METHOD FOR REAL-TIME THREE-DIMENSIONAL GEOLOGICAL MODEL CALCULATION AND RESERVOIR NAVIGATION

(75) Inventor: Pascal Luxey, Pau (FR)

(73) Assignee: BAKER HUGHES INCORPORATED, Houston, TX (US)

( * ) Notice: Subject to any disclaimer, the term of this patent is extended or adjusted under 35 U.S.C. 154(b) by 441 days.

(21) Appl. No.: 13/509,765

(22) PCT Filed: Jun. 21, 2011

(86) PCT No.: PCT/EP2011/060357
§ 371 (c)(1),
(2), (4) Date: May 14, 2012

(87) PCT Pub. No.: WO2012/175115
PCT Pub. Date: Dec. 27, 2012

(65) Prior Publication Data
US 2012/0325556 A1 Dec. 27, 2012

(51) Int. Cl.
*G06F 19/00* (2011.01)
*G01V 1/40* (2006.01)
*G01V 3/18* (2006.01)
*G01V 5/04* (2006.01)
(Continued)

(52) U.S. Cl.
CPC ............... *E21B 44/00* (2013.01); *E21B 49/00* (2013.01); *G01V 99/00* (2013.01)

(58) Field of Classification Search
CPC ......... E21B 7/00; E21B 44/00; E21B 44/005; E21B 47/00; E21B 47/0002; E21B 47/12; G01B 7/26; G01V 1/003; G01V 1/40; G01V 3/18; G01V 3/34; G01V 3/36; G01V 3/38; G01V 8/02; G01V 11/00; G01V 11/002; G01V 2210/616; G01V 2210/6161; G01V 2210/6169; G01V 2210/66; G01V 2210/72; G01V 2210/74
USPC .............. 700/159, 160; 702/2, 6, 7, 9, 10, 11; 703/2, 6, 9, 10; 324/300, 303; 73/152.01–152.03, 152.18, 152.19, 73/152.43, 152.46
See application file for complete search history.

(56) References Cited

U.S. PATENT DOCUMENTS 6,588,266 B2 * 7/2003 Tubel et al. ................ 73/152.39
7,035,165 B2    4/2006 Tang
(Continued)

FOREIGN PATENT DOCUMENTS

WO         0125823 A1    4/2001
WO     2005071222 A1    8/2005
(Continued)

OTHER PUBLICATIONS

Le Turdu, Caroline et al., "Modeling While Drilling," Middle East & Asia Reservoir Review, vol. 8, pp. 22-35 (Jan. 1, 2007).
(Continued)

*Primary Examiner* — Crystal J Barnes-Bullock
(74) *Attorney, Agent, or Firm* — Mossman, Kumar & Tyler PC

(57) ABSTRACT

A method of calculating a 3-D geologic model in real time using, as input, 2-D geologic data. The 3-D is used for conducting further drilling operations. The model may be updated in real time using additional measurements obtained during drilling operations.

16 Claims, 17 Drawing Sheets

(51) Int. Cl.
*G01V 9/00* (2006.01)
*G06G 7/48* (2006.01)
*E21B 47/12* (2012.01)
*E21B 44/00* (2006.01)
*E21B 49/00* (2006.01)
*G01V 99/00* (2009.01)

(56) References Cited

U.S. PATENT DOCUMENTS

| | | | |
|---|---|---|---|
| 7,295,005 B2* | 11/2007 | Edwards | 324/303 |
| 7,313,479 B2 | 12/2007 | Frenkel | |
| 7,317,991 B2 | 1/2008 | Wang et al. | |
| 7,359,844 B2 | 4/2008 | Sung et al. | |
| 7,359,845 B2* | 4/2008 | Kelfoun | 703/10 |
| 7,463,035 B2 | 12/2008 | Merchant et al. | |
| 7,657,375 B2 | 2/2010 | Wang et al. | |
| 8,199,166 B2* | 6/2012 | Repin et al. | 345/633 |
| 8,214,188 B2* | 7/2012 | Bailey et al. | 703/10 |
| 8,489,375 B2* | 7/2013 | Omeragic et al. | 703/10 |
| 8,532,928 B2* | 9/2013 | Tabanou et al. | 702/7 |
| 8,783,382 B2* | 7/2014 | Ignova et al. | 175/61 |
| 8,812,334 B2* | 8/2014 | Givens et al. | 705/7.11 |
| 2006/0074561 A1 | 4/2006 | Xia et al. | |
| 2006/0161350 A1 | 7/2006 | Wang et al. | |
| 2006/0161406 A1 | 7/2006 | Kelfoun | |
| 2008/0236270 A1 | 10/2008 | Denichou et al. | |
| 2008/0298174 A1 | 12/2008 | Tang et al. | |
| 2009/0119076 A1 | 5/2009 | Madatov et al. | |
| 2009/0205867 A1 | 8/2009 | Reckmann et al. | |
| 2010/0044108 A1 | 2/2010 | Bespalov et al. | |

FOREIGN PATENT DOCUMENTS

| | | |
|---|---|---|
| WO | 2005119298 A2 | 12/2005 |
| WO | 2009055152 A1 | 4/2009 |

OTHER PUBLICATIONS

Soazig, Leveque, "Refining Reservoir Models With LWD Distance to Boundary Measurements," SPE Bergen Section, pp. 1-15 (Apr. 23, 2008).

Omeragic, Dzevat et al., "3D Reservoir Characterization and Well Placement in Complex Scenarios Using Azimuthal Measurements While Drilling," SPWLA 50th Annual Logging Symposium (Jun. 21-14, 2009).

Boccioli, Stephen, "Trym Field Development: Advanced Technology and Teamwork Light the Way Through the Trym Reservoir," SPE Bergen One Day Seminar 2011, pp. 1-21 (Apr. 6, 2011).

* cited by examiner

COMPUTER-BASED METHOD FOR REAL-TIME THREE-DIMENSIONAL GEOLOGICAL MODEL CALCULATION AND RESERVOIR NAVIGATION

BACKGROUND OF THE DISCLOSURE

1. Field of the Disclosure

This disclosure relates generally to drilling of deviated wells into earth formations, and more particularly to using earth models built in real time for maintaining the drilling in a desired direction.

2. Description of the Related Art

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

Traditionally, the well planner is given a starting point, and an indication of possible dog leg severity, and some targets. With these indications, the well planner designs a trajectory that fulfils the requirement. However, most of the time, the planning does not take into account the geometry of the geological layers that may be traversed. A definite improvement of well planning is made when the well planner process uses a real-time earth model that can be used in planning the trajectory so as to increase the exposure to the reservoir. This allows for rapid changes of trajectory, better reservoir exposure and maximise wellbore life span.

In development of reservoirs, it is common to drill boreholes at a specified distance from fluid contacts within the reservoir. An example of this is shown in FIG. 2. A resistivity sensor 119 on a bottomhole assembly 121 may be used for making resistivity measurements. A drill-bit indicated by 117 drills the borehole 115 where a porous formation denoted by 105a, 105b has an oil water contact denoted by 113. The porous formation is typically capped by a caprock such as 103 that is impermeable and may further have a non-porous interval denoted by 109 underneath. The oil-water contact is denoted by 113 with oil above the contact and water below the contact: this relative positioning occurs due to the fact the oil has a lower density than water. In reality, there may not be a sharp demarcation defining the oil-water contact; instead, there may be a transition zone with a change from high oil saturation at the top to a high water saturation at the bottom. In other situations, it may be desirable to maintain a desired spacing from a gas-oil. This is depicted by 114 in FIG. 1. It should also be noted that a boundary such as 114 could, in other situations, be a gas-water contact.

The use of real-time measurements has a definite benefit in reservoir navigation. When receiving data from downhole measurement tools, these data are presented as curves following a line, either vertical or horizontal, that represents the well-bore trajectory. These representations do not take into account the changes in azimuth or inclination of the actual wellbore trajectory. The present disclosure uses a 3-D representation of the data as an aid to interpretation.

The use of Azimuthal Propagation Resistivity (APR) measurements is a good example of how the earth model helps in reservoir navigation; APR is by definition an azimuthal measurement that is best represented in a 3-D space than on a 2-D plot. The outcome of these measurements is a distance and an azimuth corresponding to the location of the closest resistivity contrast detection. This resistivity contrast may be interpreted as a geologic layer interface or a fluid interface. Therefore APR measurements display where the closest bed boundary is. An earth model built in real-time provides a contextual meaning for these measurements because the earth model is a stack of bed boundaries. The measurement can therefore be easily interpreted. It is possible to define a surface passing through several detected beds along the wellbore trajectory. The layer dips and azimuths can then be incorporated into the earth model to reflect the APR measurements.

SUMMARY OF THE DISCLOSURE

One embodiment of the disclosure is a method of conducting drilling operations. The method includes: obtaining a plurality of measurements indicative of a property of an earth formation in a 2-D model; processing the plurality of measurements in the 2-D model and obtaining a 3-D model of the earth formation; and conducting drilling operations with a bottom hole assembly (BHA) using the 3-D model.

Another embodiment of the disclosure is a non-transitory computer-readable medium product having thereon instructions that when read by at least one processor cause the at least one processor to execute a method. The method includes: processing a 2-D model of plurality of measurements indicative of a property of an earth formation and obtaining a 3-D model of the earth formation; and conducting drilling operations with a bottom hole assembly (BHA) using the 3-D model of the earth formation

BRIEF DESCRIPTION OF THE DRAWINGS

For detailed understanding of the present disclosure, reference should be made to the following detailed description of the preferred embodiment, taken is conjunction with the accompanying drawings, in which like elements have been given like numerals and wherein.

DETAILED DESCRIPTION OF THE DISCLOSURE

Figure 1:
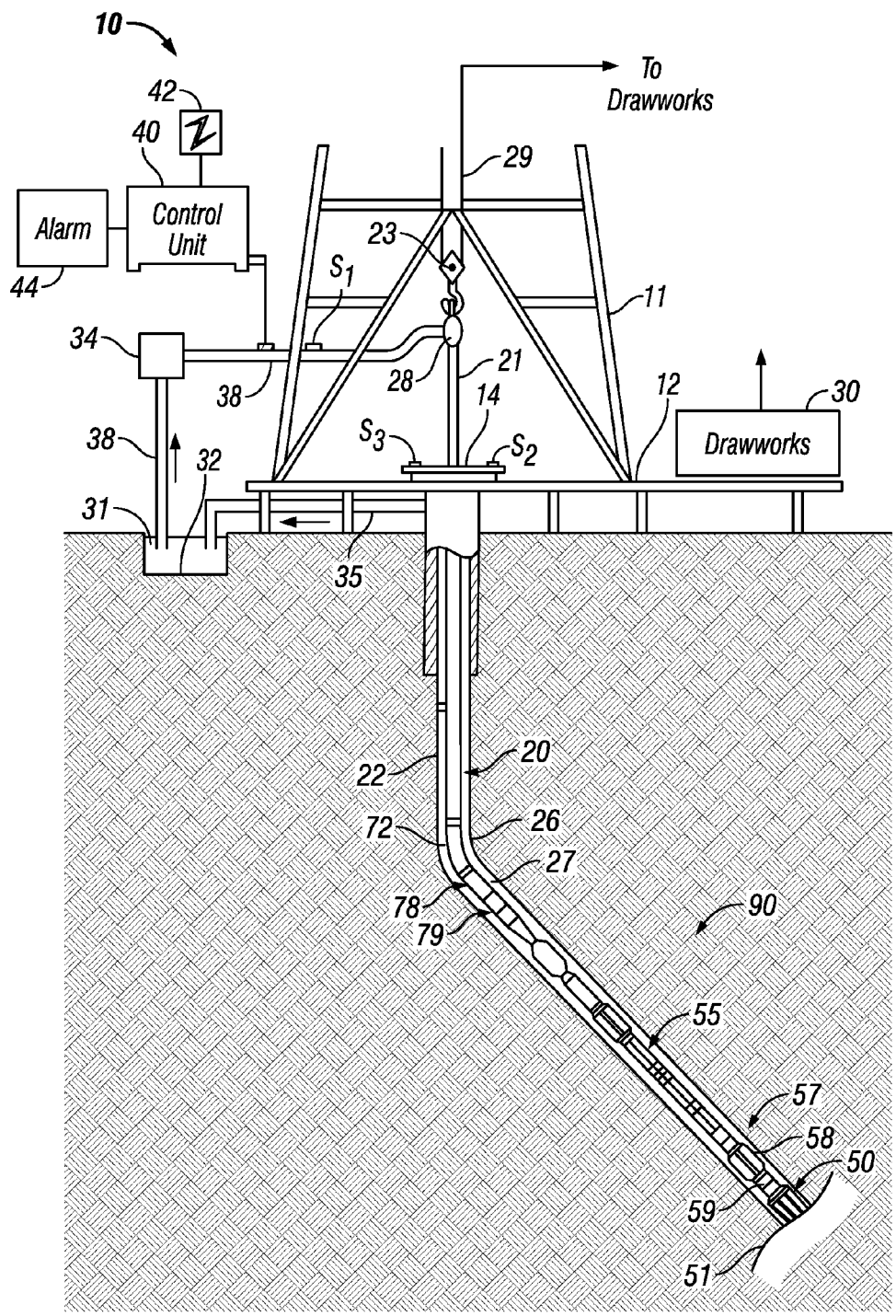
FIG. 1 shows a schematic diagram of a drilling system having a drill string that includes a sensor system according to the present disclosure.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the draw-works is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50.

The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 3:
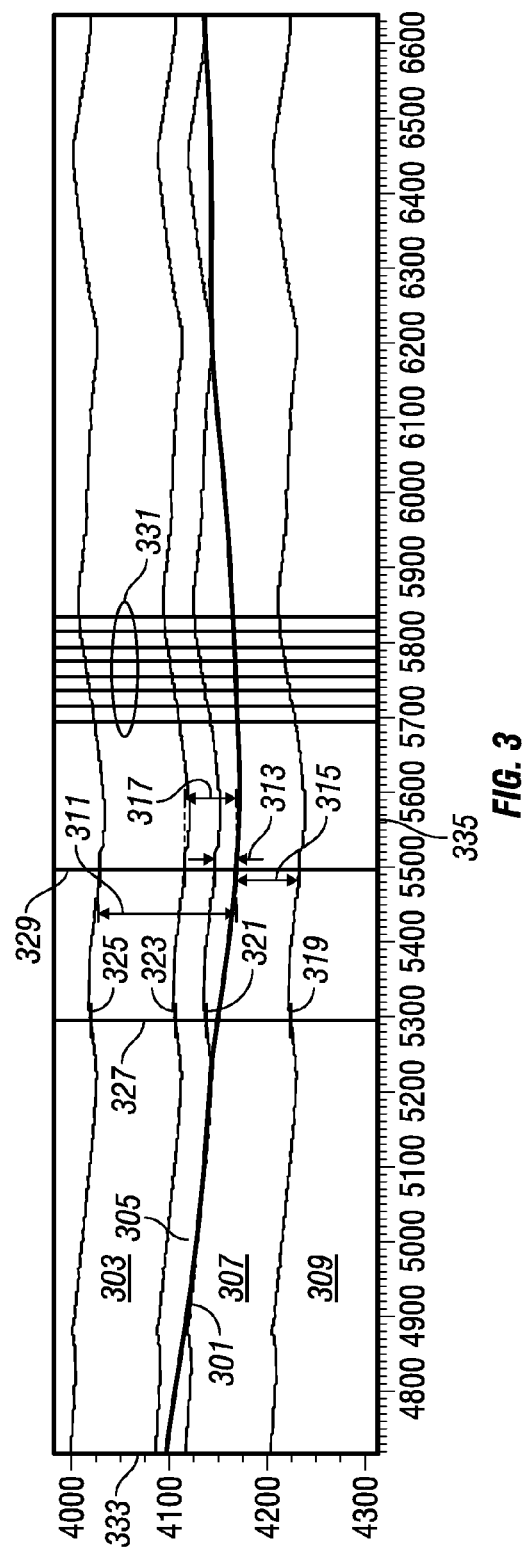
FIG. 3 shows an exemplary geologic model used for calculations performed while drilling a borehole.

FIG. 3 shows an exemplary geologic model used while drilling a borehole. Downhole tool measurements 311 in a borehole may be used to generate the geologic model. The starting point may be a 2-D geologic model in the form of a table of measured depth along a wellbore trajectory, distance of layers from the wellbore, dip, and the azimuth of each layer. Such measurements may be summarized in a table such as Table I. The geologic model is represented as a section either along the wellbore 301 or another direction. The vertical axis 333 may be the true vertical depth referred to as the Z datum (which could be the mean sea level). The vertical axis can also be a relative depth. The vertical axis can also be a relative depth. The horizontal axis (335) is a distance. This distance can be an actual distance measured from the first measured station on the well bore trajectory, a measured depth along the wellbore trajectory or a distance with any other reference. Each layer (303, 305, 307, 309) represented on the section has its own rock parameters that are not shown on the section. These parameters are used to model a theoretical tool response corresponding to the input rock parameter in the different layers of the geological model.

By adjusting the layer shape and the rock parameters, the modeled theoretical tool responses for a given rock parameter are iteratively calculated until they fit the actual downhole tool measurements acquired while drilling the borehole. It is a common practice to set the rock parameters follow a regional value given by boreholes already drilled and in which rock parameters have already been measured. The iterations are performed by adjusting the shape of the layers of the geological model and changing the rock parameter of each layer on the geological model.

Each layer in the geological model, although represented in a 2D plot, is characterized by its location away from the well bore and a surface orientation (characterized by a dip and a dip azimuth). The layers characteristics (name, distance away from the well bore, and orientation) are recorded along the well bore trajectory at intervals and are stored along vertical profiles (331).

For example, along the vertical profile (327), we know that we cross the layer (303), (305), (307), and (309) at the locations (325), (323), (321), and (319) respectively. On the vertical profile (329), the distances away at the borehole are measured as (311), (313), (315), and (317) for the layers (303), (307), (309), and (305) respectively.

For each vertical profile at a given location along the well bore trajectory referenced by its measured depth, we know:

The layering sequence along the vertical profile: the identity and number of each layer and their ordering along the vertical profile. Here in the section depicted in FIG. 3, the order for each vertical profile is from bottom up: (309), (307), (305), and (303).

The true dip and dip azimuth of these layers. This cannot be represented as such on the section in FIG. 3 but these dip and dip azimuth values correspond at the orientation of the layer along the vertical profile (327) at (319), (321), (323), and (325) points.

The distance of each layer away from the well bore along the vertical profile. These values are shown on vertical profile (329) as (311), (313), (315), and (317). From the measures while drilling we know the location in depth (either relative or absolute) of the well bore trajectory at the specific measured depth. It is then a simple calculation to derive the spatial relative or absolute depth of the layer itself once the depth of the well bore trajectory at a given measured depth is known.

By sampling vertical profiles along the well bore trajectory at a given regular or irregular measured depth interval, we can derive, for each of these vertical profiles the input parameters described above.

Table 1 represents an extract of a typical table used to characterize the layers in the geologic model represented in FIG. 3.

The first column "MD" represents the measured depth locations along the well bore trajectory where measurements are made. The interval along the well bore trajectory is set arbitrarily or automatically and is adjusted to best fit its purpose. The second column "TOP1" represents in this specific example the absolute location in depth of the top of the layer called TOP1. Instead of the absolute location in depth, a distance away from the well bore can be used as input and converted into an absolute depth by adding or subtracting the depth of the well bore at the specific measured depth. The third column "DIP" corresponds to the value of the dip of the surface of the layer TOP1 as this specific measured depth along the well bore trajectory. The fourth column "DIPAZM" corresponds to the value of the dip azimuth (with respect to the north) of the surface of the layer TOP1 as this specific measured depth along the well bore trajectory. The column 5, 6, and 7 correspond to the values of the depth, dip and dip azimuth of the layer TOP2, as explained for column 2, 3, and 4, respectively. The column 8, 9, and 10 correspond to the values of the depth, dip and dip azimuth of the layer TOP3, as explained for column 2, 3, and 4, respectively. The column 11, 12, and 13 correspond to the values of the depth, dip and dip azimuth of the layer TOP4, as explained for column 2, 3, and 4, respectively. It should be noted that instead of dip azimuth, the strike direction may be saved: this is orthogonal to the dip azimuth direction.

Each top is located in space either by its location relative to the well bore or by an absolute location system. At each measured depth along the well trajectory, the surface of the layer of the geological model is characterized by its dip and dip azimuth values. The dip and dip azimuth value may or may not be available or it may be desirable not to use them in some instances. In the case they are not available or used, only the depth values in column 4, 7, 10, and 13 are used. In order to correctly locate the points corresponding to the layer surfaces in space, we need three coordinates: two correspond to the location in space of the vertical profile along which the layer has been sampled, and the third one is its absolute or relative depth. To locate a vertical profile sampled along the well bore trajectory in a three-dimensional space, two coordinates are needed: they are located in a horizontal plane: typically called X and Y coordinates. They can be referenced to a local reference or referenced to an absolute reference, in which case, the X and Y coordinates correspond to the geographic location. In the case of this disclosure, the two coordinates in the horizontal plane X and Y correspond to the coordinates in the horizontal plane of the well bore trajectory at the sampled measured depth.

TABLE I

| MD | TOP1 | DIP | DIPAZM | TOP 2 | DIP | DIPAZM | TOP3 | DIP | DIPAZM | TOP4 | DIP | DIPAZM |
|---|---|---|---|---|---|---|---|---|---|---|---|---|
| 5000.00 | 2806.20 | 8.98 | 243.88 | 2845.20 | 9.48 | 244.28 | 2859.96 | 9.54 | 244.99 | 2899.15 | 8.98 | 243.88 |
| 5003.28 | 2806.20 | 8.98 | 243.89 | 2845.20 | 9.48 | 244.29 | 2859.96 | 9.54 | 243.89 | 2899.15 | 8.98 | 243.89 |
| 5006.56 | 2806.20 | 8.98 | 243.89 | 2845.20 | 9.48 | 244.29 | 2859.96 | 9.54 | 243.89 | 2899.15 | 8.98 | 243.89 |
| 5009.84 | 2806.20 | 8.98 | 243.89 | 2845.20 | 9.48 | 244.29 | 2859.96 | 9.54 | 243.89 | 2899.15 | 8.98 | 243.89 |
| 5013.12 | 2806.20 | 8.98 | 243.90 | 2845.20 | 9.48 | 244.31 | 2859.96 | 9.54 | 243.90 | 2899.15 | 8.98 | 243.90 |
| 5016.40 | 2806.20 | 8.98 | 243.91 | 2845.20 | 9.48 | 244.33 | 2859.96 | 9.54 | 243.91 | 2899.15 | 8.98 | 243.91 |
| 5019.69 | 2806.20 | 8.98 | 243.91 | 2845.20 | 9.48 | 244.33 | 2859.96 | 9.54 | 243.91 | 2899.15 | 8.98 | 243.91 |
| 5022.97 | 2806.20 | 8.98 | 243.92 | 2845.20 | 9.48 | 244.35 | 2859.96 | 9.54 | 243.92 | 2899.15 | 8.98 | 243.92 |
| 5026.25 | 2806.20 | 8.98 | 243.92 | 2845.20 | 9.48 | 244.35 | 2859.96 | 9.54 | 243.92 | 2899.15 | 8.98 | 243.92 |
| 5029.53 | 2806.20 | 8.97 | 243.92 | 2845.20 | 9.47 | 244.35 | 2859.96 | 9.52 | 243.92 | 2899.15 | 8.97 | 243.92 |
| 5032.81 | 2806.20 | 8.97 | 243.92 | 2845.20 | 9.47 | 244.35 | 2859.96 | 9.52 | 243.92 | 2899.15 | 8.97 | 243.92 |
| 5036.09 | 2806.20 | 8.97 | 243.92 | 2845.20 | 9.47 | 244.35 | 2859.96 | 9.52 | 243.92 | 2899.15 | 8.97 | 243.92 |
| 5039.37 | 2806.20 | 8.97 | 243.92 | 2845.20 | 9.47 | 244.35 | 2859.96 | 9.52 | 243.92 | 2899.15 | 8.97 | 243.92 |
| 5042.65 | 2806.20 | 8.96 | 243.92 | 2845.20 | 9.46 | 244.35 | 2859.96 | 9.50 | 243.92 | 2899.15 | 8.96 | 243.92 |
| 5045.93 | 2806.20 | 8.95 | 243.91 | 2845.20 | 9.45 | 244.33 | 2859.96 | 9.48 | 243.91 | 2899.15 | 8.95 | 243.91 |

Figure 4:
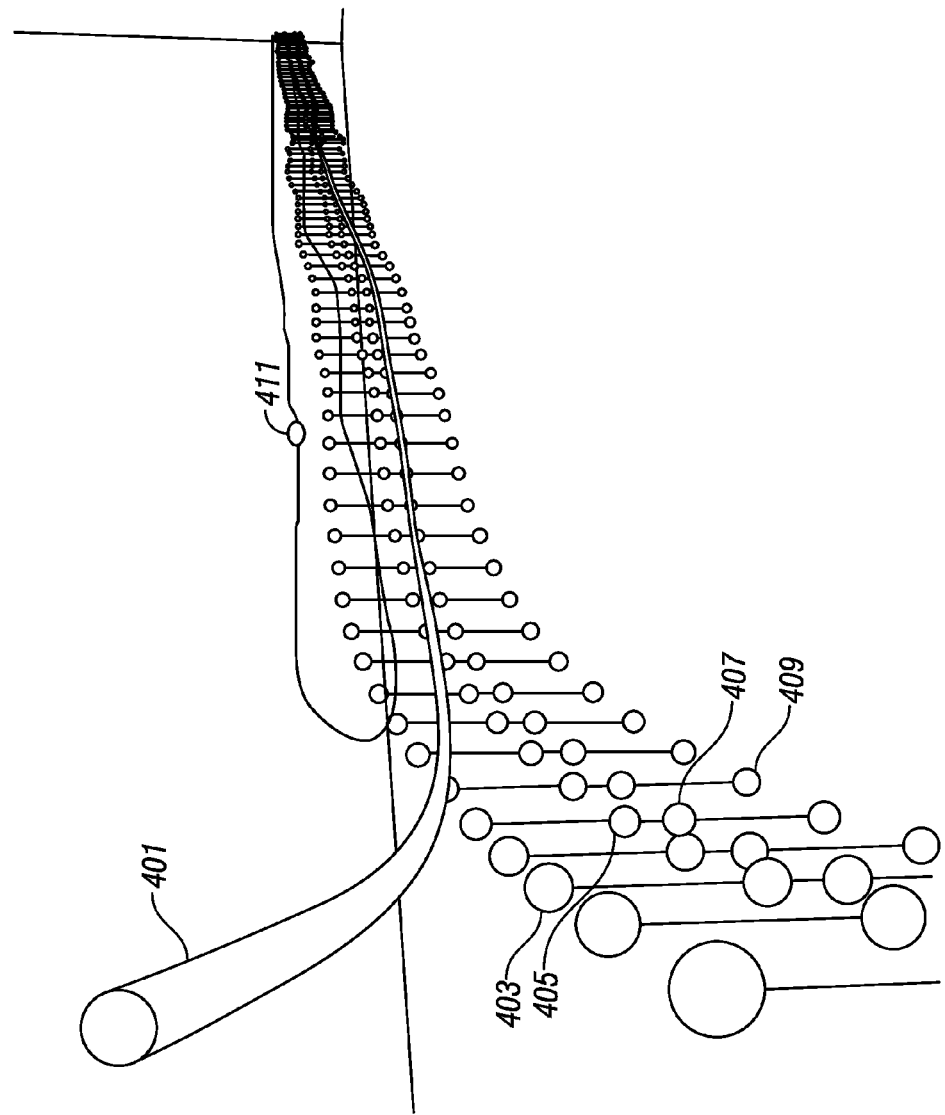
FIG. 4 is an illustration of the data from Table I.
Figure 5:
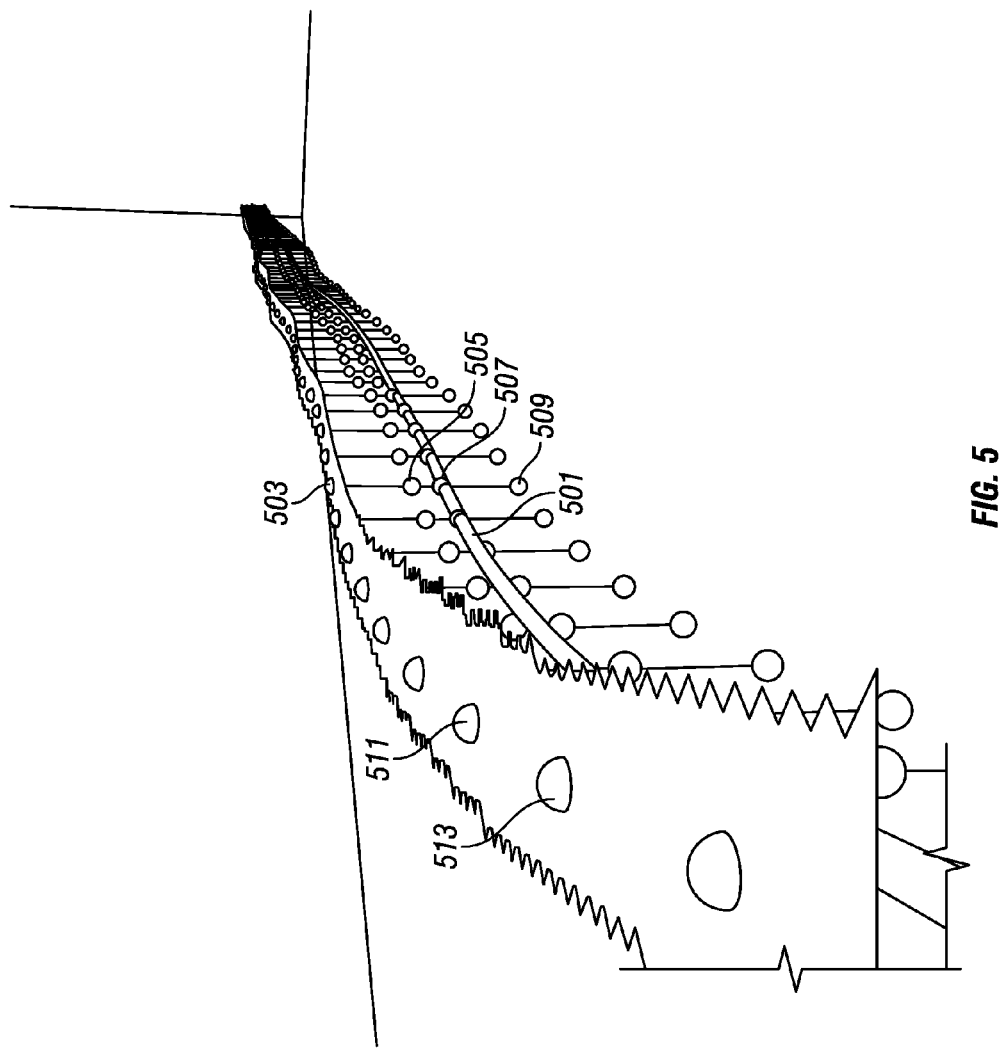
FIG. 5 shows a surface to one of the layers in FIG. 4.

Turning now to FIG. 4, a graphical illustration of the data in Table I is shown. In this illustration, the depth information of the layers (columns 4, 7, 10 and 13) is used. At each measured depth along the well bore trajectory, each layer of the geological model is characterized by its location in space, either relative to the well bore or relative to an absolute reference point. The spheres in FIG. 4 represent the location of the surface of each layer at each measured depth along the well bore trajectory. Each layer is represented by a different grey scheme. Layer (303) in FIG. 3 is now depicted with spheres (411). It is to be noted that even if the well bore (401) does not cross the layer, some information may be available as it is in the case of sphere (403). Layer (305) in FIG. 3 is represented by the sphere (405) and all the others with the same grey scale. Layer (307) in FIG. 3 is represented by sphere (407) and the others bearing the same grey scale, finally layer (309) in FIG. 3 is represented by sphere (409) and the others bearing the same grey scale. Because the wellbore trajectory may not be confined to a single plane, the model shown in FIG. 4 may be considered to be a 3-D model Turning now to FIG. 5, a surface 511 is passed through the spheres 503 relative to the well bore trajectory 501. The input needed to generate the surface 511 are the spatial coordinates of each sphere 503 belonging to this layer. The same calculation can be done for the spheres in the other layers (505, 507, and 509). The width of the surface 511 is represented along 513 and can be specified by the user. In one embodiment of the disclosure, the distance 513 may be determined by the depth of investigation of the tool used to making measurements. The model in FIG. 5 is more clearly a 3-D model than that in FIG. 4.

Figure 6:
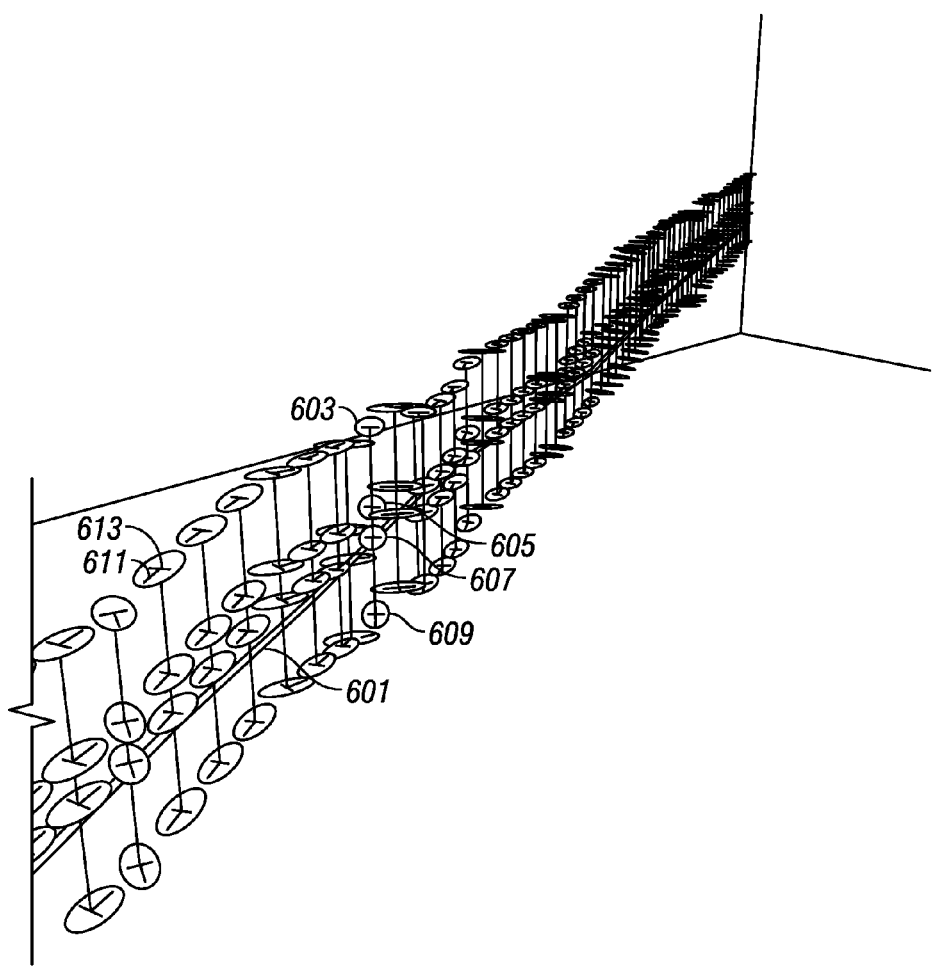
FIG. 6 is a 3-D representation of the data from Table I.

FIG. 6 is a 3-D representation of the data from Table I taking into account depth, dip (such as 611) and the strike (613) 603, 605, 607 and 609 each of the layers 303, 305, 307 and 309 along the well bore 601. In one embodiment of the disclosure, each layer is represented by a different grayscale.

Figure 7:
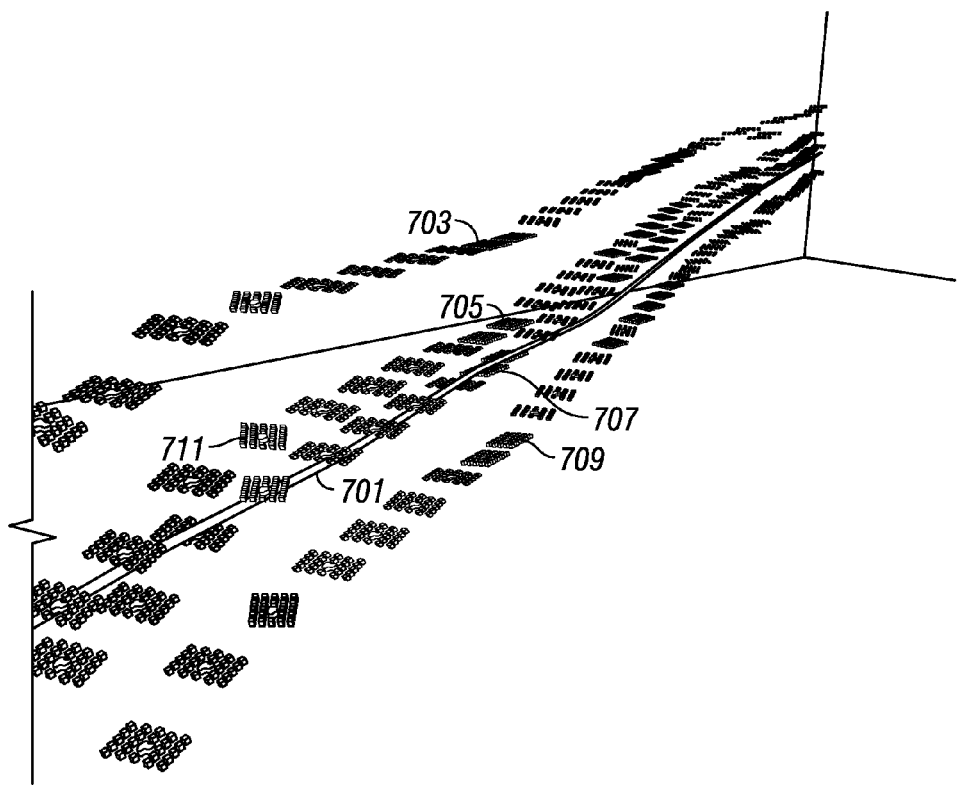
FIG. 7 is a refinement of the representation in FIG. 6.

The dip and strike information (as illustrated in (611) and (613) of FIG. 6), is used to locally refine the layer surface by creating a small, local change to the measured depth, surface (711) that depicts, in FIG. 7, with very high accuracy the variation in dip and dip azimuth of the larger layer surface. The lateral extent if these locally refined surfaces is set so these refined surfaces do not overlap each other from a vertical profile to the other. All the locally refined surfaces corresponding to a given layer in the geological sequence are concatenated into a single surface set as illustrated here by layer (703), (705), (707) and (709) relative to the well bore trajectory 701. At the end of the process there are as many surface sets as there are layers in the geological sequence. The clusters of points created in this manner are concatenated together into one group of points for each layer in the geological model. Each group of points is then used to generate a single surface that passes through all the points in the group.

Figure 8:
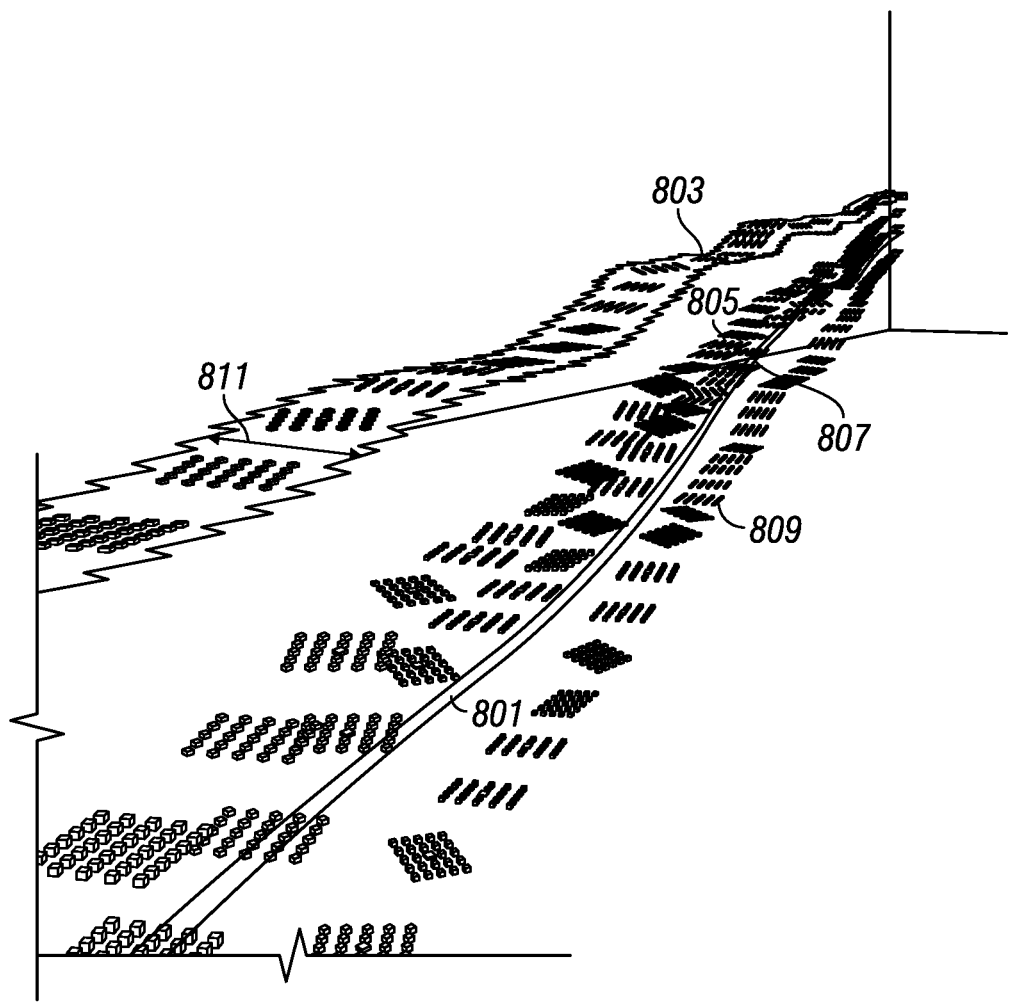
FIG. 8 shows a result of fitting a smooth surface to the data of the uppermost surface in FIG. 7.

In FIG. 8, a single surface 811 is passed through all the points in the set belonging to the uppermost layer 803. The surface 811 is then considered to describe accurately the shape and location of the upper layer 803 in the geologic model as it accounts for dip and strike at each vertical location. The same procedure may be applied to all the layers 805, 807, and 809 in the geologic model relative to the wellbore trajectory 801.

Figure 9:
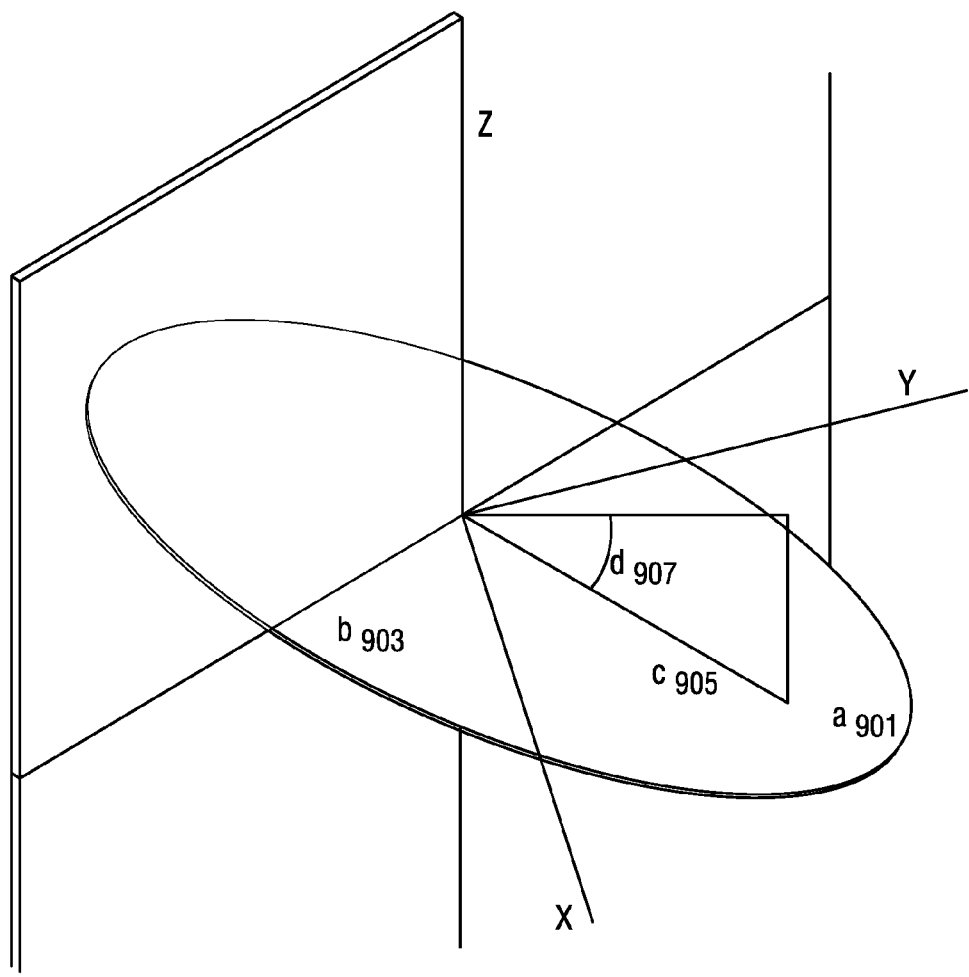
FIG. 9 shows the various angles involved in the depiction of the surface.

FIG. 9 shows the various angles and directions involved in the depiction of a layer in the subsurface. The ellipse 901 corresponds to a small surface element from the 2-D geologic model of FIG. 3. The surface 901 may be characterized by two parameters: the dip 907 that is the angle between the surface 901 and a horizontal, and the dip azimuth 905. The strike direction of the surface 901 is denoted by 903.

Figure 10:
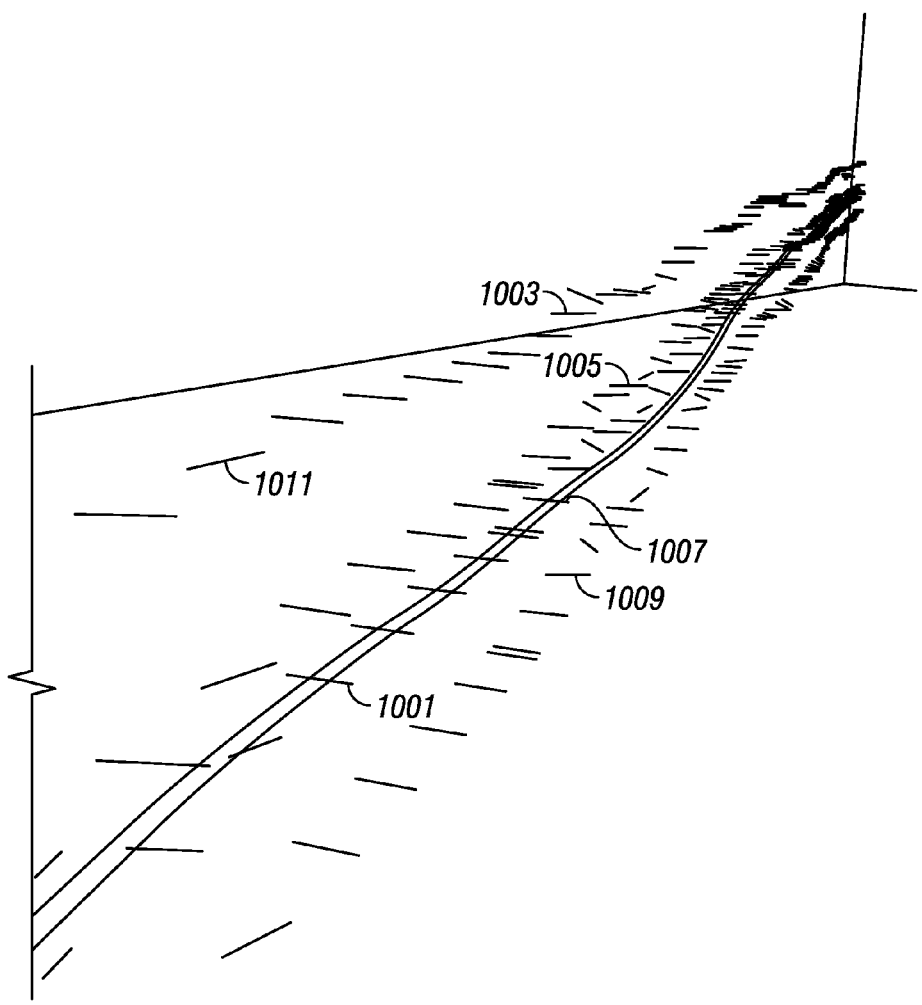
FIG. 10 shows a line that intersects a smooth surface and a vertical plane oriented with a strike normal to the dip azimuth direction of the smooth surface.

In one embodiment of the disclosure, dip and dip azimuth values are used to calculate a point with X, Y, Z coordinates, dip, and dip azimuth for each layer identified at each vertical profiles. In this embodiment of the disclosure, the dip and dip azimuth information of each layer along each vertical profile is used to calculate the line that intersects the locally refined surface and a vertical plane orientated with a strike normal to the dip azimuth direction of the refined surface in question as explained on FIG. 9. The intersection is a rectilinear line striking with the same orientation as the layer local surface and located in space exactly where the layer is identified along the vertical profile. The lateral extent of each line is set so that a line does not cross another line from another sampled measured depth vertical profile. All the lines corresponding to a given layer in the geological sequence are concatenated into a single line set. At the end of the process there are as many line sets as there are layers in the geological sequence. These line sets characterize with great accuracy the location and the orientation variations of the layer surface along the well bore trajectory. This is shown by 1003, 1005, 1007, 1009 and 1011 in FIG. 10. The dip of the layer which is not depicted by the lines will be reflected in the depth changes of each line along the well bore trajectory 1001.

Figure 11:
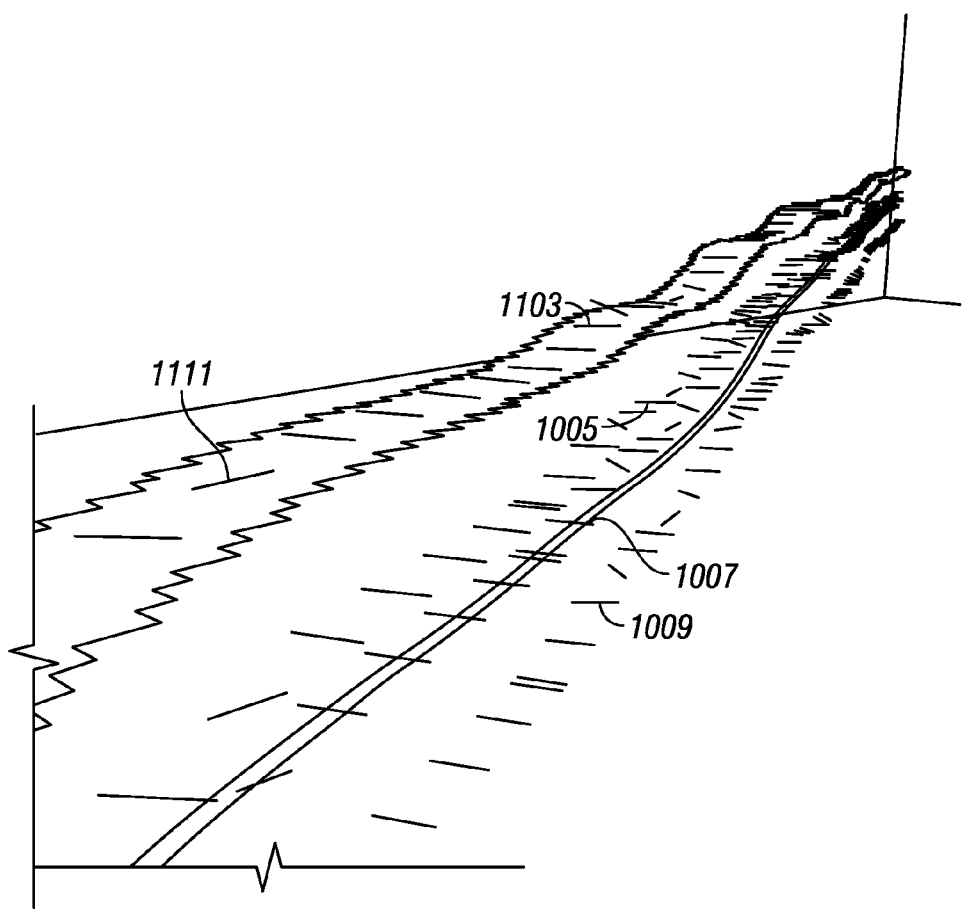
FIG. 11 shows a result of fitting a smooth surface to the data of the uppermost surface in FIG. 10.

In FIG. 11, a single surface 1111 is passed through all the lines in the set belonging to the uppermost layer 1103 this surface is then considered to describe accurately the shape and location of the upper layer 1103 in the geological model. The lack of information regarding the local dip at each measured depth measures is compensated by the sampling of the surfaces along the well bore trajectory. This surface 1111 does not describe the shape of the layer (b) as well as on FIG. 7, but is an accurate approximation given a sampling interval properly chosen. The same procedure is applied to all the layers 1005, 1007, and 1009 in the geological model of FIG. 10.

Figure 12:
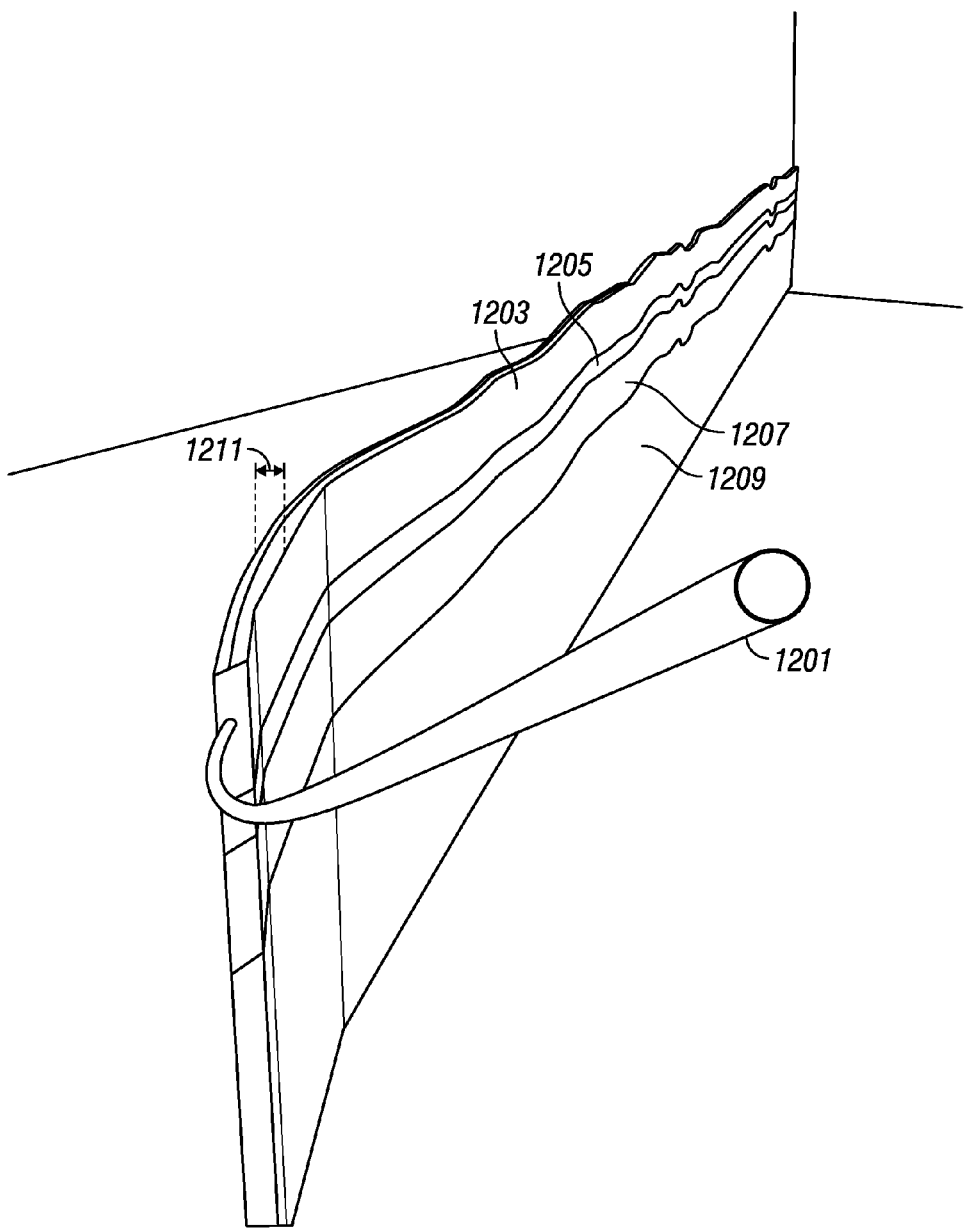
FIG. 12 shows the display along the wellbore trajectory with a breadth determined by the depth of investigation.

The geologic model FIG. 12 runs along the well bore trajectory 1201 and is built with a breath 1211 equivalent on both side of the well bore trajectory 1201. This breadth 1211 is set by the user and should in the range of the Depth of Investigation (DOI) of the tool actually used and from which data have been used to generate the input for this model. As explained above the layer in this example is composed of five layers 1201, 1203, 1205, 1207 and 1209. They have been built from surfaces like the one depicted above. Each layer has its own surface built and all these surfaces are assembled into a single geologic model.

Figure 2:
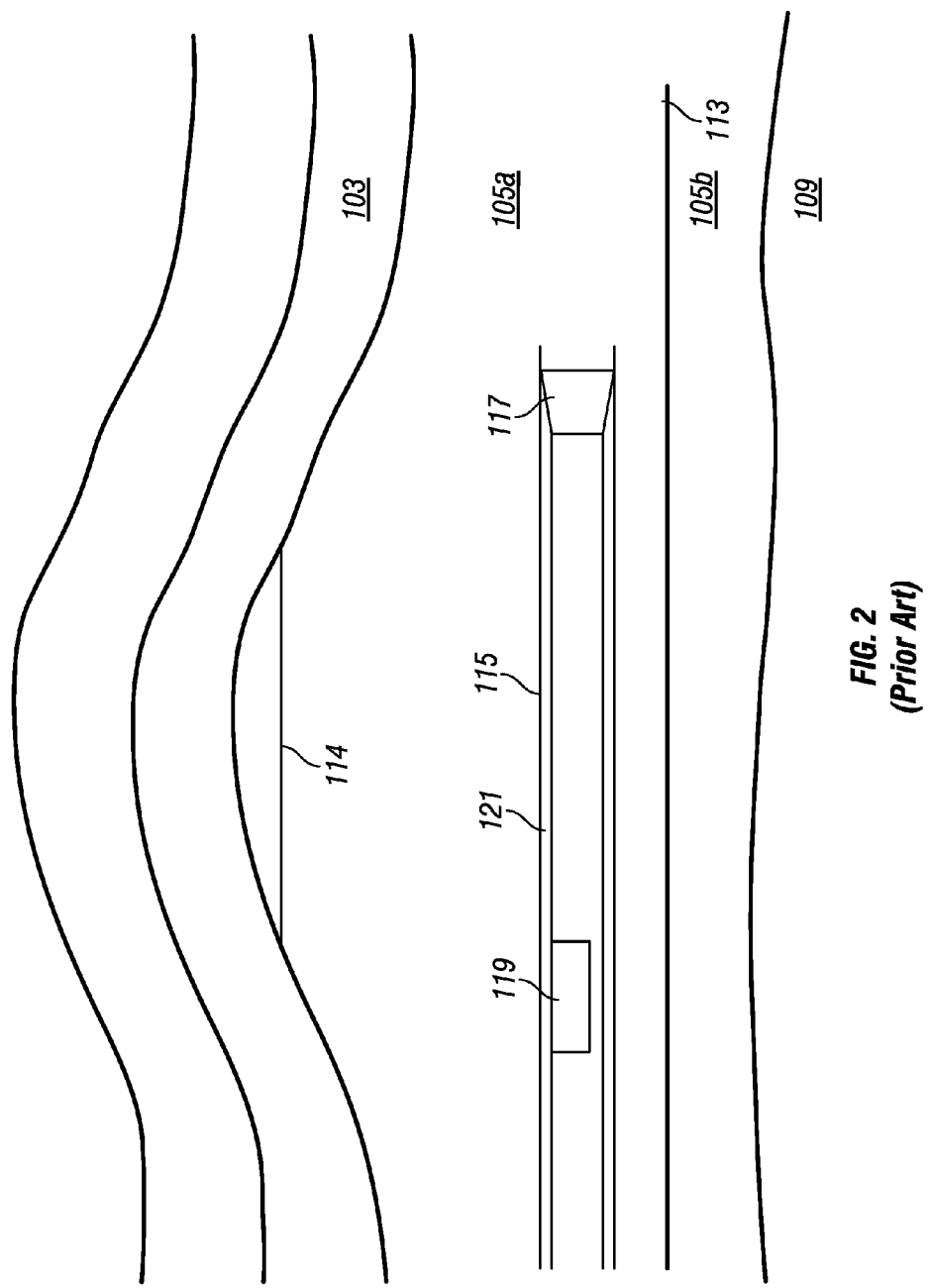
FIG. 2 is an illustration of a substantially horizontal borehole proximate to an oil/water contact in a reservoir.
Figure 13:
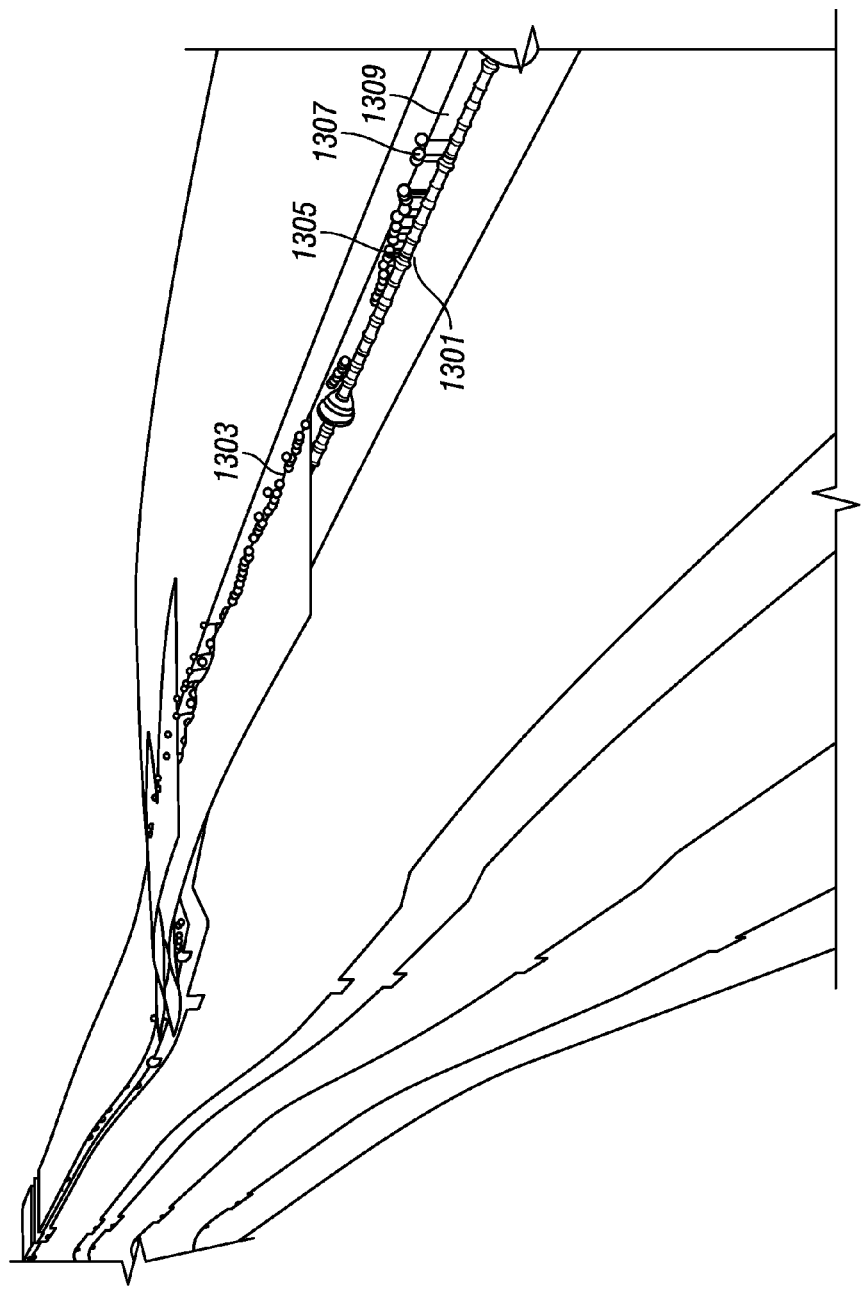
FIG. 13 shows a simple example of local changes in structure that are inconsistent with the model during reservoir navigation.

An important part of the present disclosure is the ability to make measurements in real-time and update the model as the wellbore is being drilled. During reservoir navigation such as shown in FIG. 2, representations of downhole measurements typically do not take into account the changing azimuth or inclination of the actual wellbore trajectory. Certain measurements benefit a great deal from knowledge of the actual wellbore trajectory. An example of this would be the use of azimuthally propagation resistivity (APR) measurements that provide the ability to determine the distance and orientation from the APR sensor to a resistivity contrast in the earth formation. Shown in FIG. 13 is a BHA 1301 in a borehole. The resistivity measurements 1303 and 1307 are reasonably consistent with the model surface 1309. However, the resistivity measurements 1305 suggest local variations in the position of the interface 1309 that are not accounted for in the model and should be integrated into the model. This is an example of reservoir navigation in which drilling is carried out trying to maintain a predetermined distance from an interface.

Figure 14:
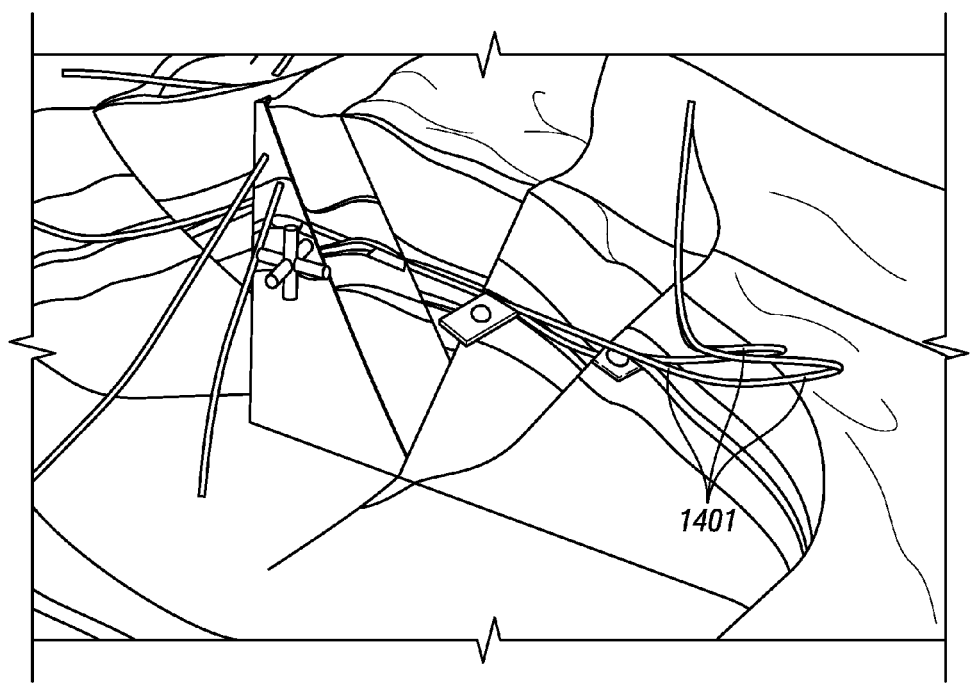
FIG. 14 shows an example of a well designed to intersect a reservoir in a plurality of fault blocks.

In drilling in complex structure, the well planners are typically given a starting point, indications regarding the dog leg severity, and some targets. With these indications, they design a trajectory that fulfils the requirement but that most of the time doesn't take into account the geometry of the geological layers they cross. A definite improvement of directional drilling is made when the well planner is given the real-time earth model and he can put his trajectory so he increases the reservoir exposure by changing the wellbore trajectory so it is located at all possible location within the reservoir. This allows for rapid changes of trajectory, better reservoir exposure and maximise wellbore life span. An example of this is shown by the rather complicated well trajectory 1401 in FIG. 14 where a single well is designed to intercept the same reservoir in a plurality of fault blocks.

Figure 15:
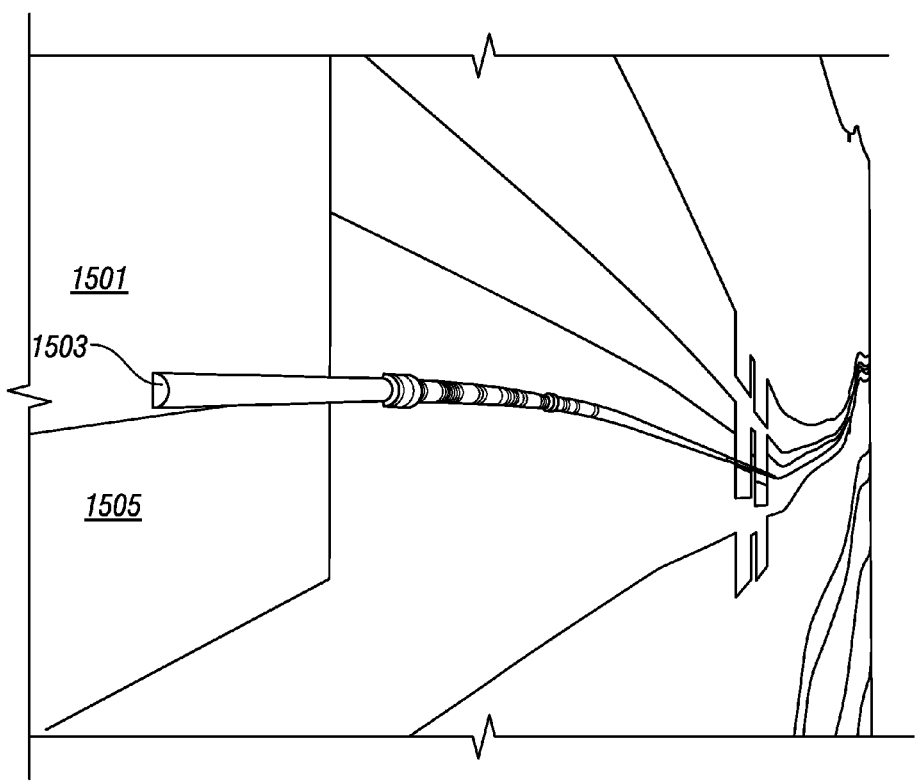
FIG. 15 shows an example of a BHA drilling along the boundary between two and different formations.

The display of a BHA in the context of an earth model built in real-time, allows improvement regarding physical drilling conditions. For example the display of the bending moment that expresses the amount of bending applied to the BHA along with the orientation of the bend allows the prediction of the direction of drill bit before a survey point is measured. Also the display in 3D of the different BHA components (tools, stabilizers, joints, bit) with respect to their location within the drilled formation allows the understanding of the lack of transmission of Weight on Bit (WOB) for example. This is shown in FIG. 15 where, the BHA 1503 is displayed on the geologic model. It is seen to be at the boundary between formation 1501 and 1505. If the two formations have different strengths, problems would occur with a stabilizer and in transmitting the weight on bit. This is an example of diagnosing drilling conditions based on a position of the BHA in the geological model.

Figure 16:
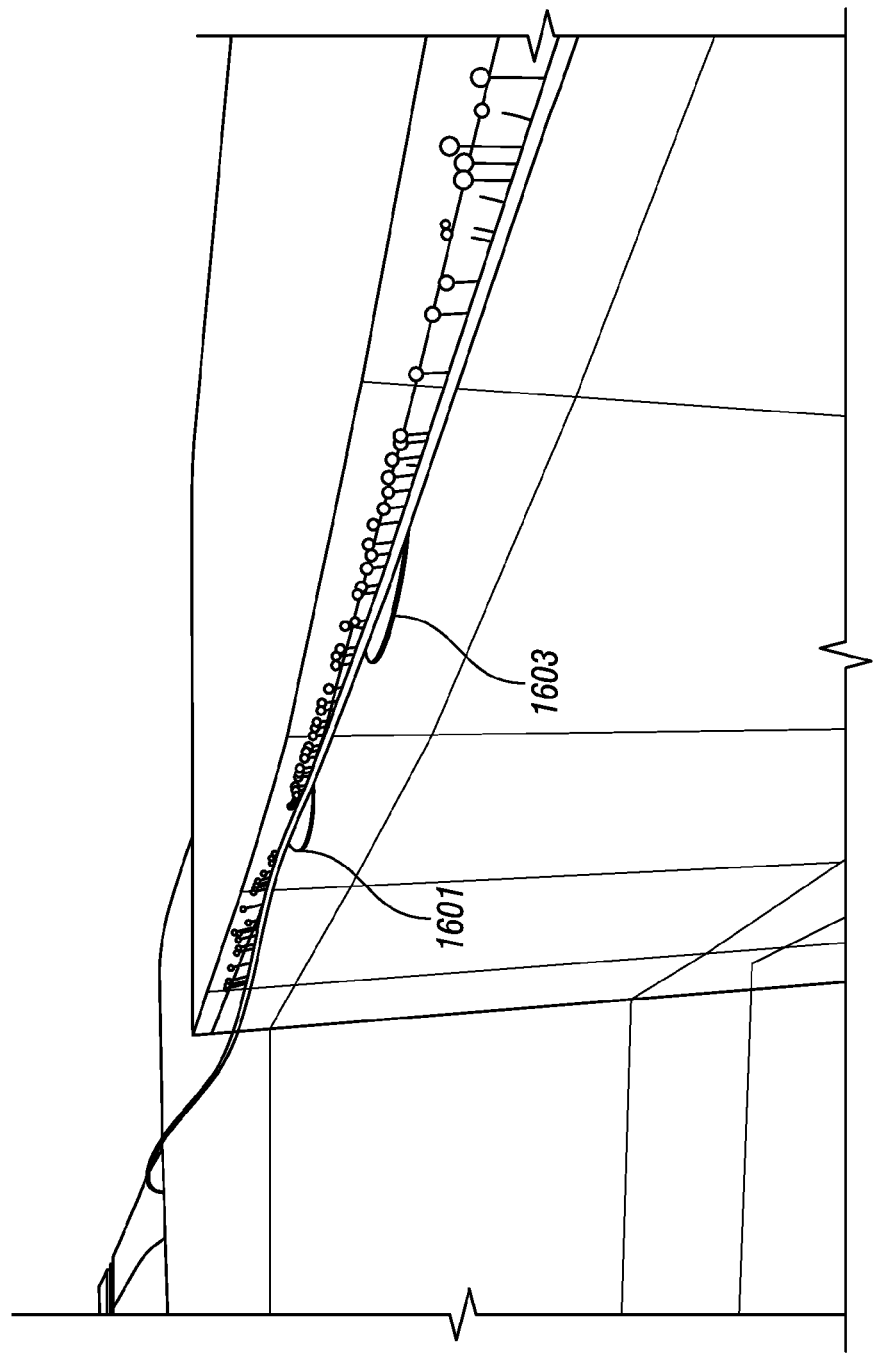
FIG. 16 shows an example possible changes in depositional environment along the wellbore trajectory.

High accuracy azimuthal electrical resistivity image of the near wellbore formation allow the display of very detailed features like in-geological layer structures. It is therefore possible to appreciate the depositional environment and change the direction of the well bore trajectory following the indication displayed by these electrical images. The dip and dip azimuth of these features can be picked and the picked dips are displayed in 3D using discs with highlight the orientation of the deposition within the layer of the earth model built in real-time. This allows the determination of the internal bed structure, and in the case of sand and shale interbedded deposition, the change of the well bore trajectory is made following these indications. For instance, features, such as 1601 and 1603 as depicted in FIG. 16, may be indicative of point bars in a meandering river channel.

In one embodiment of the disclosure, the method disclosed in U.S. Pat. No. 7,657,375 to Wang, et al., may be used. As disclosed therein, differences in the dip estimated by a shallow reading device (such as a dip meter) and a deep reading device (such as a multicomponent induction tool) can be used to estimate the size of undulations away from the borehole. In another embodiment of the disclosure, the method disclosed in U.S. Pat. No. 7,317,991 to Wang et al. may be used. As disclosed therein, multicomponent measurements made in a cross-bedded earth formation are processed to give one or more equivalent models having transverse isotropy (TI). Resistivity information about the cross-bedding is obtained from one of the TI models and a measured cross-bedding angle. Resistivity information about the cross-bedding may also be obtained using a combination of two or more of the equivalent TI models.

Figure 17:
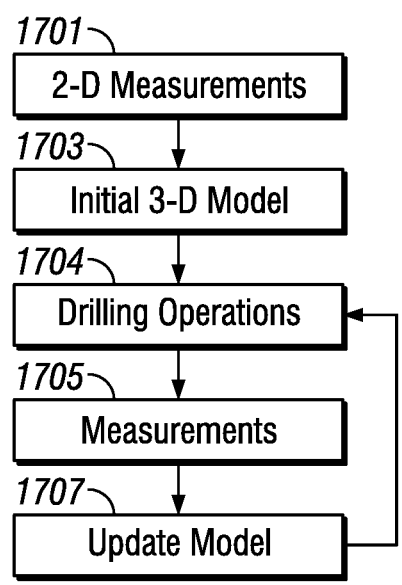
FIG. 17 is a flow chart illustrating some of the steps of the present disclosure.

FIG. 17 is a flow chart illustrating some of the steps of the present disclosure. One embodiment of the disclosure is a method of conducting drilling operations. The method includes: obtaining measurements indicative of a property of an earth formation in a 2-D model (1701); processing measurements in the 2-D model and obtaining a 3-D model of the earth formation (1703); conducting drilling operations with a bottom hole assembly (BHA) using the 3-D model (1704); making an additional measurement using a sensor on the BHA in the borehole during the drilling of the borehole (1705); and using the additional measurement for providing an updated 3-D model of the earth formation (1707). The additional measurements may include a shallow reading measurement and a deep reading measurement to estimate the size of undulations away from the borehole. The additional measurements may also include a multicomponent induction resistivity measurement to identify the cross-bedding.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks. The term "processor" as used herein is intended to include such devices as Field Programmable Gate Arrays (FPGAs).

The foregoing description is directed to particular embodiments of the present disclosure for the purpose of illustration and explanation it will be apparent, however, to one skilled in the art that many modifications and changes to the embodiments set forth above are possible without departing from the scope and the spirit of the disclosure. It is intended that the following claims be interpreted to embrace all such modifications and changes.

What is claimed is:

1. A method of conducting drilling operations, the method comprising:
    obtaining a plurality of measurements indicative of at least one property of an earth formation in a 2-D model comprising a plurality of layers;
    processing the plurality of measurements in the 2-D model to display a 3-D model of the earth formation;
    displaying the 3-D model of the earth formation comprising at least one azimuth of each layer; and
    conducting drilling operations with a bottom hole assembly (BHA) using the 3-D model.

2. The method of claim 1 wherein conducting drilling operations further comprises drilling a borehole, the method further comprising:
    making an additional measurement using a sensor on the BHA in the borehole during the drilling of the borehole; and
    using the additional measurement for providing an updated 3-D model of the earth formation.

3. The method of claim 2 further comprising conducting additional drilling operations using the updated 3-D model of the earth formation.

4. The method of claim 3 wherein conducting additional drilling operations further comprises at least one of: (i) reservoir navigation, (ii) selecting a drilling direction to intercept a reservoir in a selected fault block, or (iii) diagnosing a drilling condition using a position of the BHA in the 3-D geologic model.

5. The method of claim 2 wherein the additional measurement further comprises a measurement indicative of a distance from the sensor to a layer boundary and an orientation of the layer boundary relative to the sensor.

6. The method of claim 2 wherein the additional measurement includes a shallow reading measurement and a deep reading measurement; the method further comprising estimating an undulation away from the borehole using a difference between the shallow reading measurement and the deep reading measurement.

7. The method of claim 2 wherein the additional measurement includes a multicomponent induction resistivity measurement; the method further comprising identifying a cross-bedding in the earth formation.

8. The method of claim 1 wherein the measurements in the 2-D are selected from: (i) a measured depth along a wellbore trajectory, (ii) a distance of a linear from the wellbore, (iii) a dip of the layer, and (iv) an azimuth of a layer.

9. The method of claim 1 wherein conducting drilling operations further comprises at least one of: (i) reservoir navigation, (ii) selecting a drilling direction to intercept a reservoir in a selected fault block, or (iii) diagnosing a drilling condition using a position of the BHA in the 3-D geologic model.

10. The method of claim 1, further comprising:
wherein displaying the 3-D model of the earth formation comprises displaying the at least one azimuth of each layer and at least one dip of each layer.

11. The method of claim 10, further comprising:
generating at least one locally refined surface for each layer that does not overlap with another locally refined surface from the same layer, wherein each locally refined surface indicates the at least one azimuth of each layer and the at least one dip of each layer;
wherein displaying the 3-D model of the earth formation comprises displaying the at least one locally refined surface for each layer.

12. The method of claim 11, further comprising:
generating a layer surface for each plurality of layers, wherein each layer surface passes through the at least one locally refined surface corresponding to each plurality of layers;
wherein displaying the 3-D model of the earth formation comprises displaying the layer surfaces.

13. The method of claim 1, further comprising:
wherein the measurements are indicative of a plurality of depths along the well bore, a depth of each plurality of layers, a dip of each plurality of layers, and a dip azimuth of each plurality of layers in the 2-D model.

14. A non-transitory computer-readable medium product having thereon instructions the when read by at least one processor cause the at least one processor to execute a method, the method comprising
obtaining a plurality of measurements indicative of at least one property of an earth formation in a 2-D model comprising a plurality of layers;
processing the plurality of measurements in the 2-D model to display a 3-D model of the earth formation; displaying the 3-D model of the earth formation comprising at least one azimuth of each layer; and
conducting drilling operations with a bottom hole assembly (BHA) using the 3-D model.

15. The non-transitory computer-readable medium product of claim 14 further comprising instructions that enable the at least one processor to further:
use an additional measurement made by a sensor on the BHA in a borehole during the drilling of the borehole for providing an updated 3-D model of the earth formation.

16. The non-transitory computer-readable medium product of claim 14 further comprising at least one of (i) a ROM, (ii) an EPROM, (iii) an EEPROM, (iv) a flash memory, or (v) an optical disk.

* * * * *